United States Patent [19]
Watanabe et al.

[11] 3,802,045
[45] Apr. 9, 1974

[54] PROCESS FOR THE MANUFACTURE OF LATTICE WORK BLOCKS

[76] Inventors: Takeo Watanabe, 67, Otsu-machi 2-chome, Yokosuka-shi Kanagawa-ken; Takeo Fukuda, 491 Okubo-cho, Konan-ku, Yokohama-shi, Kanagawa-ken, both of Japan

[22] Filed: June 8, 1972

[21] Appl. No.: 261,100

[30] Foreign Application Priority Data
June 8, 1971   Japan.............................. 46-39810

[52] U.S. Cl. ............................ 29/155 R, 29/200 A
[51] Int. Cl...................... B23p 17/00, B23p 19/00
[58] Field of Search .......... 29/155 R, 155 C, 200 A, 29/430, 429

[56] References Cited
UNITED STATES PATENTS
| | | | |
|---|---|---|---|
| 3,546,772 | 12/1970 | McConnell | 29/200 A X |
| 3,584,360 | 6/1971 | Trofimov et al. | 29/155 R |
| 3,613,204 | 10/1971 | McConnell | 29/430 |

*Primary Examiner*—Thomas H. Eager
*Attorney, Agent, or Firm*—Armstrong & Wegner

[57] ABSTRACT

A method and apparatus for assembling a lattice work of transverse and longitudinal members wherein the longitudinal members are fed from a carriage by a guide and feeding means into recesses in the transverse members which are held by base members. The carriage, guide and feeding means and base members are all mounted on guide rails to insure proper alignment and to move the elements with respect to one another.

8 Claims, 13 Drawing Figures

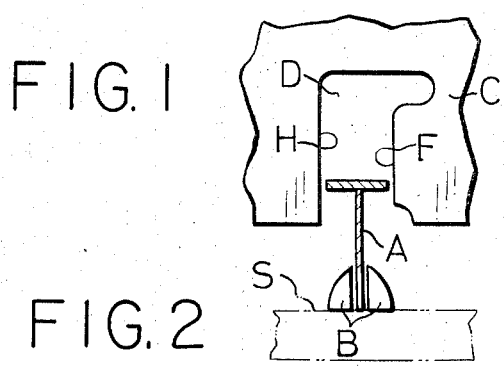
FIG. 1
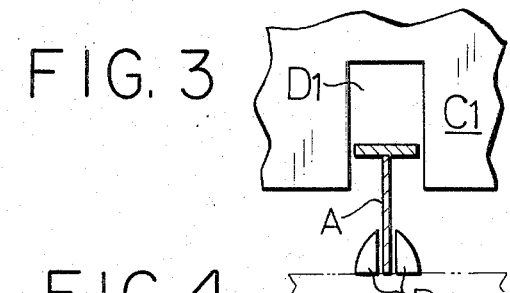
FIG. 3
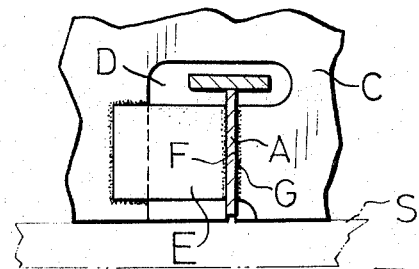
FIG. 2
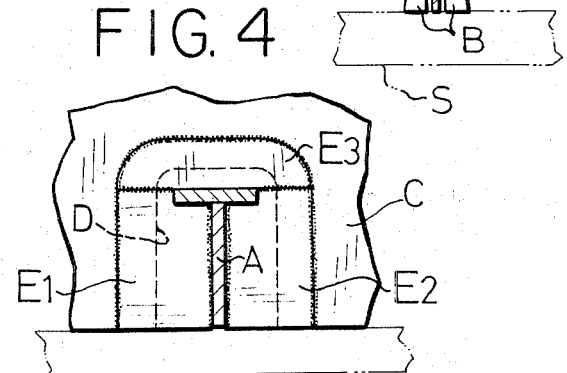
FIG. 4
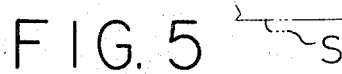
FIG. 5
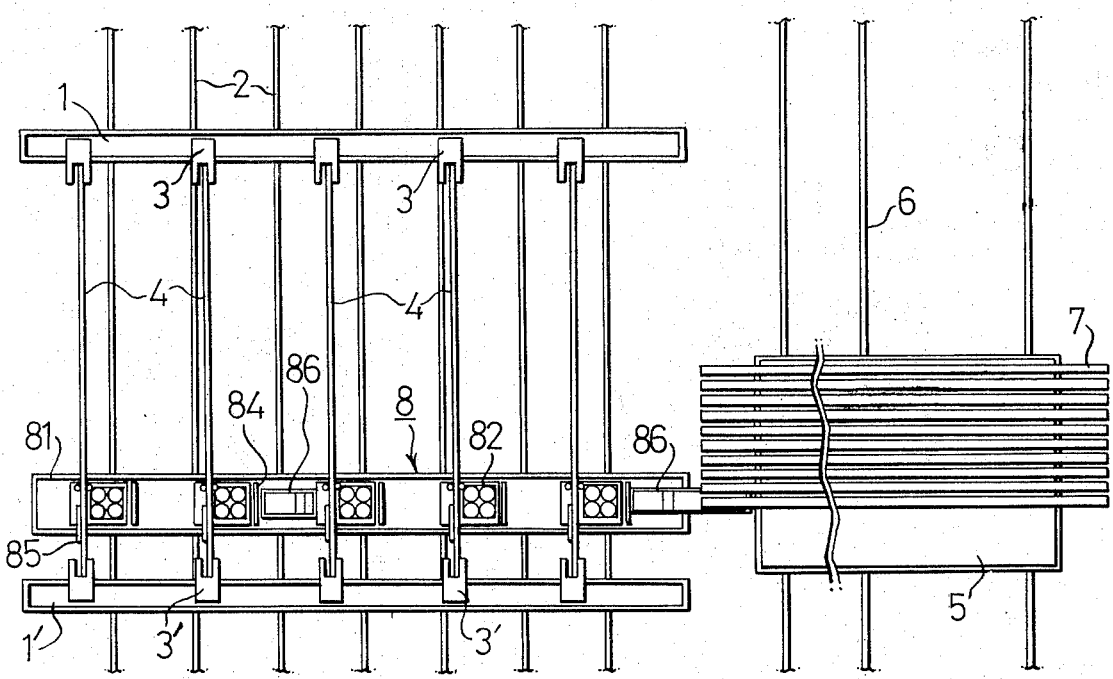
FIG. 6
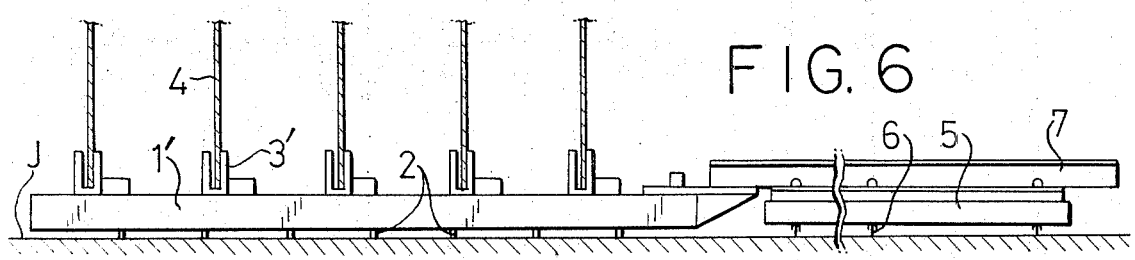

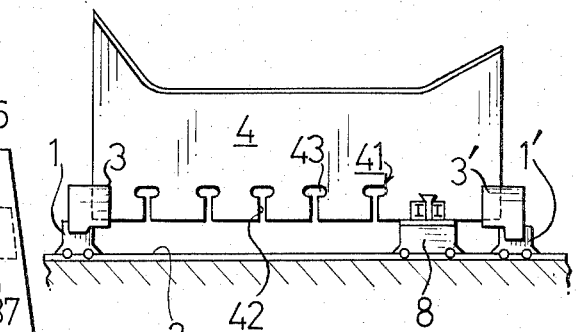
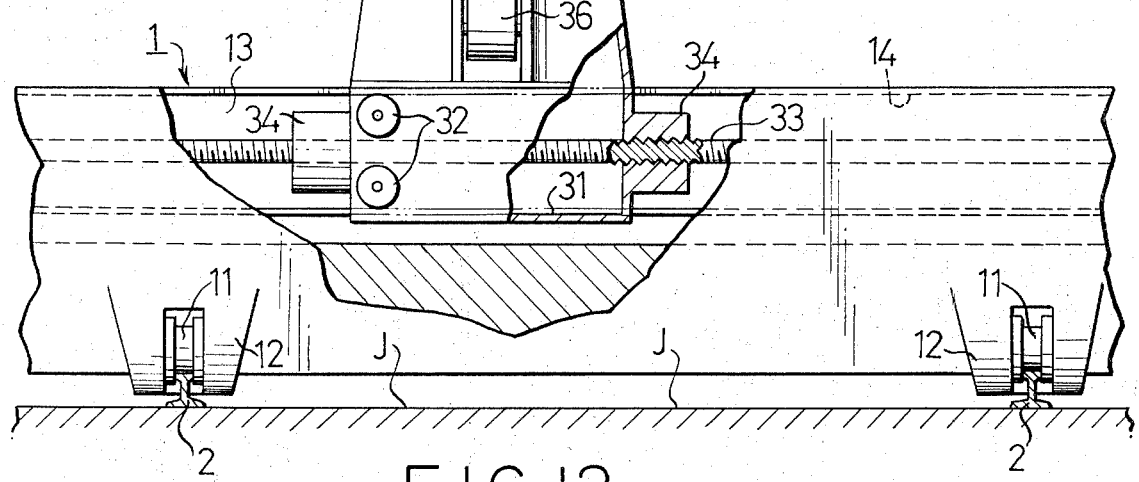
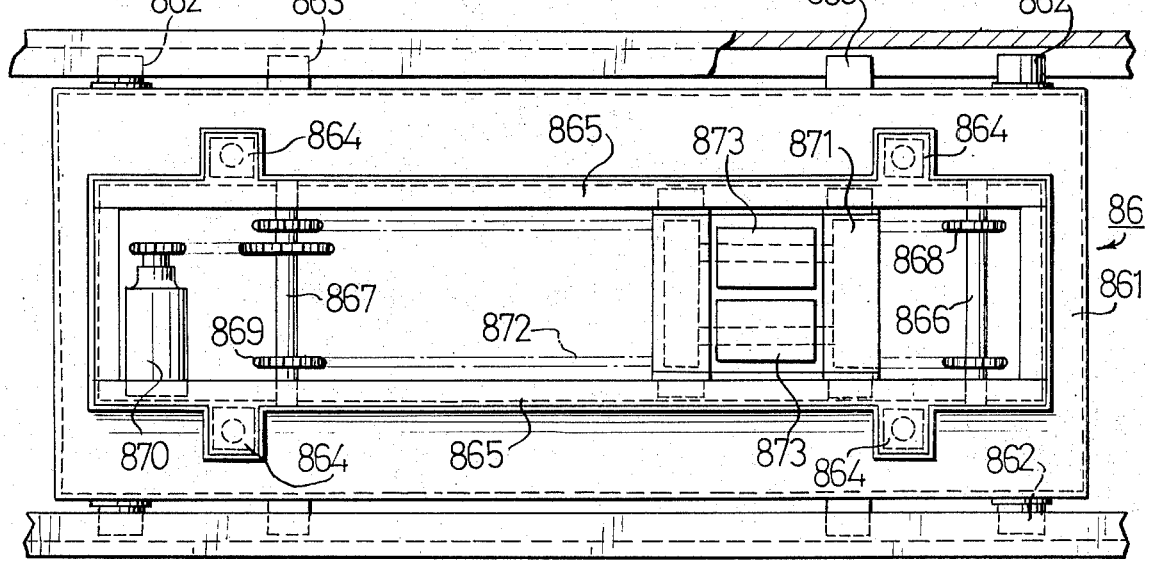

PROCESS FOR THE MANUFACTURE OF LATTICE WORK BLOCKS

This invention relates to improvements in and relating to a process and apparatus for the manufacture of lattice work blocks, each comprising a plurality of parallel transverse members and a number of parallel longitudinal members arranged perpendicular to said transverse members and rigidly welded thereto. These lattice work blocks are broadly in use in the form of construction units for building a ship's hull, bridge structure, steel framed buildings and the like.

An object of the present invention is to provide an improved process for the manufacture of a metallic, preferably steel, lattice work blocks comprising a number of transverse members and longitudinal members welded together into a rigid unit, providing the possibility of relying on an automatic welding technique.

A further object of the invention is to provide a process for the manufacture of a lattice work block of the above kind, yet having a highly improved dimensional precision and in a highly expedited manner.

These and further objects, features and advantages of the invention will become more apparent when the following detailed description of the invention is read and in a comparative way in certain preferred aspects, and by reference to the accompanying drawings. In the drawings:

FIGS. 1 and 2 are partially sectioned schematic elevations showing two stages of a conventional welding procedure for realization of a welded cross between a longitudinal and a transverse member, only partially shown, according to the conventional technique.

FIGS. 3 and 4 are similar views to FIGS. 1 and 2, respectively, showing somewhat different conventional welding procedure for the similar purpose.

FIG. 5 is a view showing a preferred embodiment of the process according to this invention for the manufacture of a steel lattice work block.

FIG. 6 is a side elevational view of the lattice work block under construction shown in FIG. 5.

FIG. 7 is an end elevation thereof.

FIG. 9 is a front view, partially sectioned, of the arrangement shown in FIG. 8.

FIG. 12 is a plan view of a longitudinal feed-out unit usable in the invention.

Figure 8:
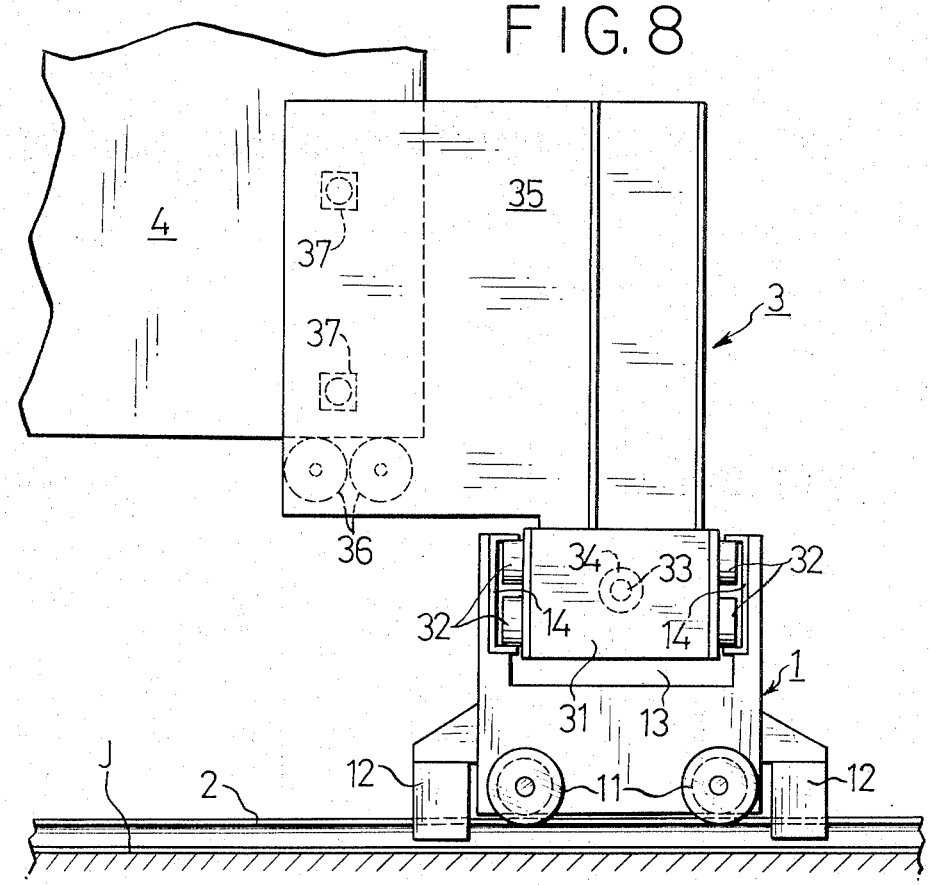
FIG. 8 is a side elevational view of a base frame and a clamping device mounted thereon, which are usable in the execution of the manufacturing process according to this invention.

Before entering into the detailed description of a preferred embodiment of the invention, a comparative and conventional technique will first be described in detail by reference to FIGS. 1–4.

Referring now to FIG. 1, a conventional process for the manufacture of a lattice work block is schematically shown.

"S" represents only partially a large size, rigid and precise base plate mounted horizontally on the floor, and not shown. Although only one is shown, a number of longitudinal members "A", each having a T-section, are placed on the base plate "S" in parallel to each other and perpendicular to the drawing paper of FIG. 1. A pair of weighted positioning members "B" are placed on the base plate, so as to provisionally secure the lower end of the web part of the longitudinal member, as shown. A number of transverse members "C" are successively lowered from above by a crane (not shown) so as to bring attributed one of the recesses D into its cooperating position, until the lower end of the transverse member C abuts on the upper surface of the base plate or frame S. At this stage, the upper flange part of the longitudinal member "A" is positioned within the territory of the upper and horizontally enlarged part of recess D. When the configuration of a this recess D is of non-water tight nature due to assembly in the manner to be described, the transverse member C is shifted horizontally to the left as shown in FIG. 2, so as to bring one of the vertical edges F, defining partially said recess D, into contact with the web part of the longitudinal member A. Upon attainment of this condition, the confronting and contacting surfaces of said web part and the inwardly projecting and shorter edge F are welded together. The opposite surface of the web part of longitudinal member A is welded with a connecting member E, frequently called collar among those skilled in the art, and the opposite or outer end part of said connecting member is welded to the opposite part of the transverse member C. In this way, the welding job for one crossing point between the members A and C has been completed.

In the case of the welding job shown in FIGS. 3 and 4, the members A, B and S are similar to those shown and described in the foregoing. In this case, the configuration of the recess shown at D1 has been somewhat modified from that shown in the foregoing, so as to provide a water tight joint, upon welded up.

In this case, three connecting members E1, E2 and E3 are employed for welding the longitudinal member A to the transverse member C1, so as to completely fill up the otherwise existing idle gaps between the recess-defining edges of the member C1 and the member "A". These connecting members E1–E3 are also frequently called collars among those skilled in the art.

It will be seen from the foregoing, that when employing the conventional technique for the manufacture of large size lattice work blocks, adapted especially for the building of a large ship's hull, the collar welding must consume a large amount of skilled man power which results in a substantially increased construction costs for the hull. As an example, the height of the longitudinal member may frequently exceed 1 meter so that it can be handled manually only with great difficulty, if at all. In addition, large size transverse members or stocks must be handled by a crane or the like to assemble with the longitudinal members or stocks into a lattice work stock, which job is highly troublesome and time-consuming, especially in the case of building-up of a very large size ship's hull.

As will be more fully understood as the description proceeds, the present invention provides a highly efficient, advantageous and economical process for the manufacture of the larger metallic lattice work blocks highly adapted for the building of a large size ship's hull.

On the contrary to the aforementioned conventional technique and in accordance with the novel teaching of the present invention, a plurality of transverse members or stocks are arranged in parallel to each otehr, each of which is preparatorily formed with a plurality of T-shaped recesses having substantially same dimensions as the corresponding longitudinal members or stocks and the same pitch as those of the latter with which they are to be assembled. Then, these longitudinal members are taken down, one by one, from a carriage carrying these members and introduced into or through a plurality of said recesses arranged in registration one after another in a line, so as to form an assembled lattice work unit, as will be more specifically described hereinafter when considered with FIGS. 5–13.

Referring next to FIGS. 5–13, especially FIGS. 5–7 thereof, reference numerals 1 and 1' represent two parallel and elongated supporting and guiding base members movably mounted on the floor J through a plurality of guide rails 2 which are arranged perpendicular to the elongated base members as clearly shown.

Although not shown, roller or wheel means may be provided on the bottom surfaces of these base members 1 and 1', so as to provide a more easy, convenient and accurate guidance thereof on and along these guide rails. Although not shown, there are provided proper positioning and securing means for proper and adjustable setting of these base members 1 and 1' on and along these guide rails, as will be most clearly understood as the description proceeds, especially by reference to FIG. 9.

On each of these movable base members 1 and 1', a plurality of clamping members 3 or 3' are provided which are movable along the member 1 or 1' and may be positioned at any desired position as by means of screw type rewiring means, although not shown for simplicity purposes.

By using a transversal pair of these clamps 3 and 3', a transverse stock 4 can be set in position to take its vertical arrangement. By adopting similar jobs, a plurality of transverse stocks 4 may be set so as to occupy their vertical and mutually parallel position at a certain predetermined constant pitch.

Along the lower end edge, there has been formed beforehand a plurality of T-shaped recesses 41 having a certain constant pitch one after another. When viewed through the plurality of transverse stocks in the direction parallel to the elongated base members 1 and 1', these recesses 41 are arranged in parallel rows.

Numeral 5 represents a carriage which is shiftable on and along a plurality of further guide rails 6 which are arranged on the floor J in parallel to the aforementioned first series of rails 2. A number of longitudinal stocks 7 are mounted on this carriage, said stocks 7 being arranged in the longitudinal direction of said carriage which direction is parallel to the lateral rows of said recesses 41 and thus to the axles of said base members 1 and 1' and perpendicular to the first and second rail groups 2 and 6, respectively.

Numeral 8 represents a longitudinal forwarding and feeding unit which is shiftable on and along the first group of guide rails 2 and set to any desired position, and comprises a carriage 81 which carries a plurality of longitudinal centering units 82 designed and arranged to shift along the elongated carriage 81. Ths carriage 81 is provided with guide and push-up means 84 and 85 and two forwarding and feed-out units 86, so as to feed longitudinal stocks 7 forward stock-to-stock into and through said rows of T-shaped recesses 41, as will be more fully described hereinafter.

More specifically, when a longitudinal stock has been fed out into position, the carriage 81 acts such that the stock is kept at its slightly pushed-up position and then while keeping this position for the newly forwarded and inserted longitudinal stock, the carriage 81 is moved on and along guide rails 2 so as to come up to registration with next row of the recesses 41, whereupon a next succeeding longitudinal stock is forwarded and inserted in position as before. During this longitudinal-forwarding operation, the beforehand up-kept longitudinal member is subjected to a welding operation so as to unite with the transverse stock 4 in a provisional manner necessary for preliminary position of the longitudinal member before receiving a finish welding.

Upon completion of this provisional welding job, the carriage 81 is further shifted to the next succeeding position so as to forward and insert a third longitudinal.

In this way, the longitudinal stocks 7 are unloaded from the first carriage 5 and forwarded and inserted into their respective allocated positions in succession and welded to the parallel transverse stocks 4, so as to provide a desired lattice work stock.

Next referring to FIGS. 8 and 9, the base member 1 (or 1'), is provided with guide rolls or wheels 11 and rail clamp means 12, and thus it can roll on and along the rails 2 and fixed at any desired position.

At an upper part of the base member 1, there is formed an opening 13 and a pair of guide rails 14 arranged in opposition to each other and at the both sides of said opening 13, as clearly seen from FIG. 8. As seen in FIG. 8, each of these rails 14 has the shape of a channel.

The base shown at 31 of clamping unit 3 is capable of moving on and along the related base member 1 or 1' by means of two pairs of guide rollers 32 which are rotatably mounted on the base 31 and kept in rolling contact with said guide rails 14 of the elongated base member 1 or 1', said rails 14 extending in the longitudinal direction of the related base member.

An elongated adjusting screw rod 33 is provided along the whole length of said opening 13 and rotatably mounted at the end walls of said base member 1 or 1' so as to be allowed to turn, but not to shift in any way in the longitudinal direction of the base member, although the necessary bearing means and stop means provided at the end walls partially defining said opening 13 have been omitted from the drawing only for simplicity. In addition, it should be noted that the adjusting screw 33 has been omitted from FIG. 5 for avoiding confusion. Although not shown, the adjusting screw 33 is provided at either with a manipulating handle.

A pair of screw nut means 34 are rigidly attached to the base 31, said adjusting screw rod 33 extending through the base and kept in threaded engagement with these nut means. Thus, by turning the screw rod, the clamping unit 3 can be moved to-and-fro horizontally in FIG. 9 and thus, in the longitudinal direction along 1 or 1'. If necessary, the nut means 34 may be reduced in its number from two to one.

A pair of vertical extending support members 35 ar rigidly mounted on said base 31 in opposition to each other, as shown specifically in FIG. 9. Two supporting rollers 36 are mounted at the lower part of said base 31 for supporting one end of the lowermost edge of a transverse stock 4, in cooperation with two clamp cylinders 37, said rollers 36 being arranged within the gap space defined by and between the support members 35 and said clamp cylinders 37 being mounted on one of these members, as most clearly be seen from FIG. 9.

By mans of a crane, a transverse stock 4 is introduced at the lower part of its one end into said gap sapce from upper relative to one clamp unit 3 or 3'. At the same time, similar operation is carried out at the opposite clamp unit 3' or 3. In this way, the stock 4 is kept in vertical position at a certain predetermined height from the level of the upper surfaces of base members 1 and 1' and at a predetermined relationship horizontally relative thereto.

This procedure is repeated with each of the remaining pairs of clamp units 3 and 3'. Since the T-shaped slots or recesses 41 are formed preparatorily in the same way for every transverse stock 4, the related recesses 41 are arranged precisely in a horizontal row upon completion of the transverse stock election job, and parallel to the base members 1 and 1'.

Figure 11:
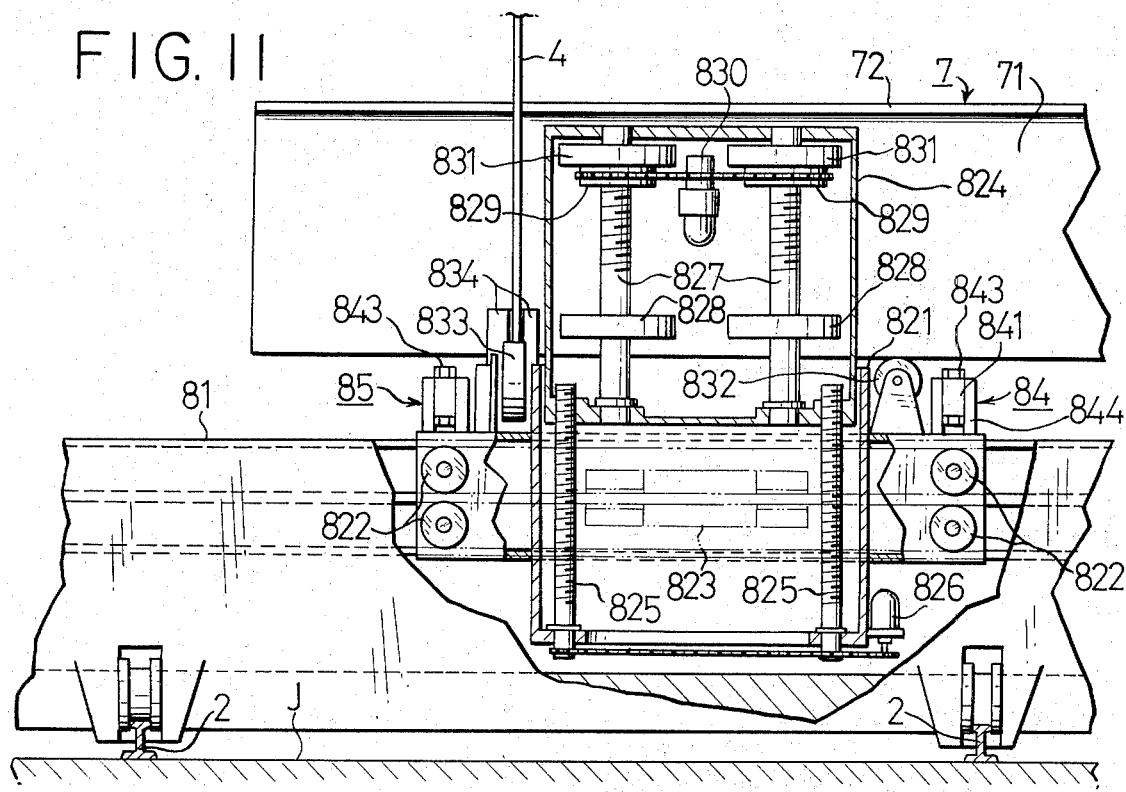
FIG. 11 is a front view thereof, yet partially sectioned.
Figure 10:
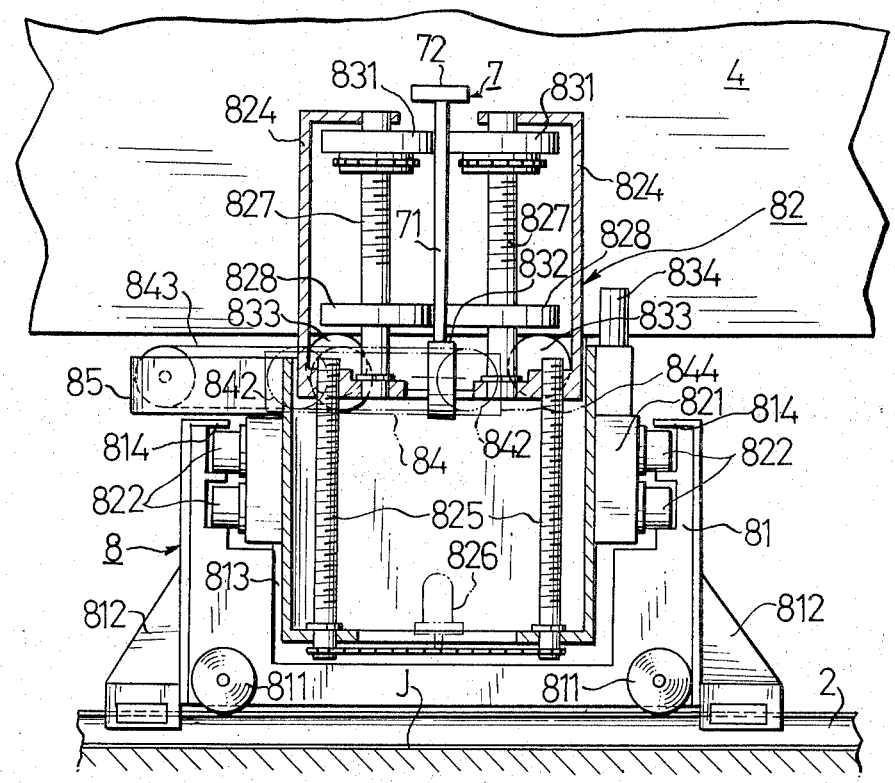
FIG. 10 is a side elevation, partially sectioned, of a combination of a carriage with a longitudinal centering unit which is usable in the execution of the manufacturing process according to this invention.

As seen from FIGS. 10 and 11, carriage 81 of longitudinal forwarding and feed-out unit 8 is provided with guide rollers 811 and rail clamp units 812, thus said carriage being rollable on and along an attributed one of the guide rails 2 and positioned at any suitably selected position thereon. The carriage 81 is formed with a lateral inside opening 813, a pair of guide rails of channel shape being provided at the both side of said opening 813, as most clearly seen from FIG. 10.

Base 821 of longitudinal centering unit 82 is provided with two pairs of guide rollers 822 which are rollingly guided by a pair of E-shaped, opposedly arranged guide rails 814. The unit 82 is movable in the transverse direction relative to the rails 2, by actuation of a hydraulic piston-cylinder means which are not shown. The base 821 is further provided with conventional rail clamp means of conventional design and thus only schematically shown, and it can be positioned stationarily at any selected position relative to the related transverse stock 4. Base 821 is provided with a frame 824 which can be lowered or elevated in its position by means of positioning screws 825 rotatable upon reception of motion from an attributed electric motor 826. With the frame 824 positioned at its lowest position, the frame 824 takes its position substantially wholly submerged within the base 821. By the frame 824, four vertically arranged roller shafts 827 are suported and a horizontally arranged roller 828 is attached rotatably at the lower end of each of said roller shafts. At the upper end portion, each of these roller shafts 828 is male threaded and receives a female threaded ring 829. Motor 830 is mounted on the frame 824 and capable of moving up or down as desired by the reception of motion from said motor 830 through sprocket or belt drive means. On the ring 829, an upper horizontal roller 831 is loosely and concentrically mounted.

As seen from FIG. 10, the roller pair 828; 831 has a mutual gap slightly larger than the thickness of the web, specifically shown at 71 in FIGS. 10 and 11, of a longitudinal stock.

As will be later more fully described, the roller pairs 831; 831 and 828; 828 guide the longitudinal so as to hold it an its upright position by providing it with proper guidance. A supporting roller 832 is also provided for each of the units for properly supporting the longitudinal stock 7 from below and at a proper predetermined level.

Carriage 81 is moved on and along the rail 2 after the transverse stock 4 has been fixed at their both ends by means of clamp units 3 and 3'.

In order to correct irregular deformation which may appear frequently at the intermediate portion between the both ends of the transverse sheet stock 4, the base 821 is provided with rollers 833 adapted for support of the lower edge of the stock 4 and with a pair of deformation correcting rollers 834 which is provided at one side, more specifically at the left side of the unit when seen in FIG. 11. The top portion of each of the rollers 833 is positioned at a slightly higher level than the top portion of roller 832.

Numerals 84 and 85 represent two longitudinal push-up units which are at the both sides of the base 921 when seen in FIG. 11.

As will be more fully described hereinafter, these longitudinal push-up units 84 and 85 function so that upon forwarding feeding-in job of a longe 7 into and through a row of T-shaped recesses 41, they will push up the longe to a certain predetermined level and hold it at this level, until the carriage 81 is transferred to its next working position in relation to and in registration with a next succeeding row of T-recesses 41, for allowing a provisional welding job to rigidly fix the relative and predetermined position between said longitudinal and the related transverse stock.

Longitudinal push-up unit 84 is provided substantially at the center of base 821, while longitudinal push-up unit 85 is positioned so as to protrude from the center of base 821 in the reverse direction relative to the advancing direction of carriage 41. Each of these units is provided with a pair of sprocket wheels 842 rotatably mounted on support frame 841, an endless chain 843 being threaded between and around these sprouckets. At the intermediate of the lower run of the chain 843, a supporting plate is provided to prevent excess hung-over when receiving a relatively heavy downwardly directing vertical load, although not specifically shown. Support frame 841 is mounted on a supporting block 844 fixedly mounted on base 821 so as to be movable up-or-down as desired by utilization of conventional hydraulic piston-cylinder unit, although not specifically shown. When the support frame 841 is elevated in it position, chain 843 acts to push up the longitudinal member 7 and when, under these conditions, the carriage is moved (at this stage, frame 824 is kept at its lowered position), sprockets 842 are rotated and thus, the carriage 81 can perform a smooth movement relative to the longitudinal already passed through the related row of T-shaped recess 41.

Figure 13:
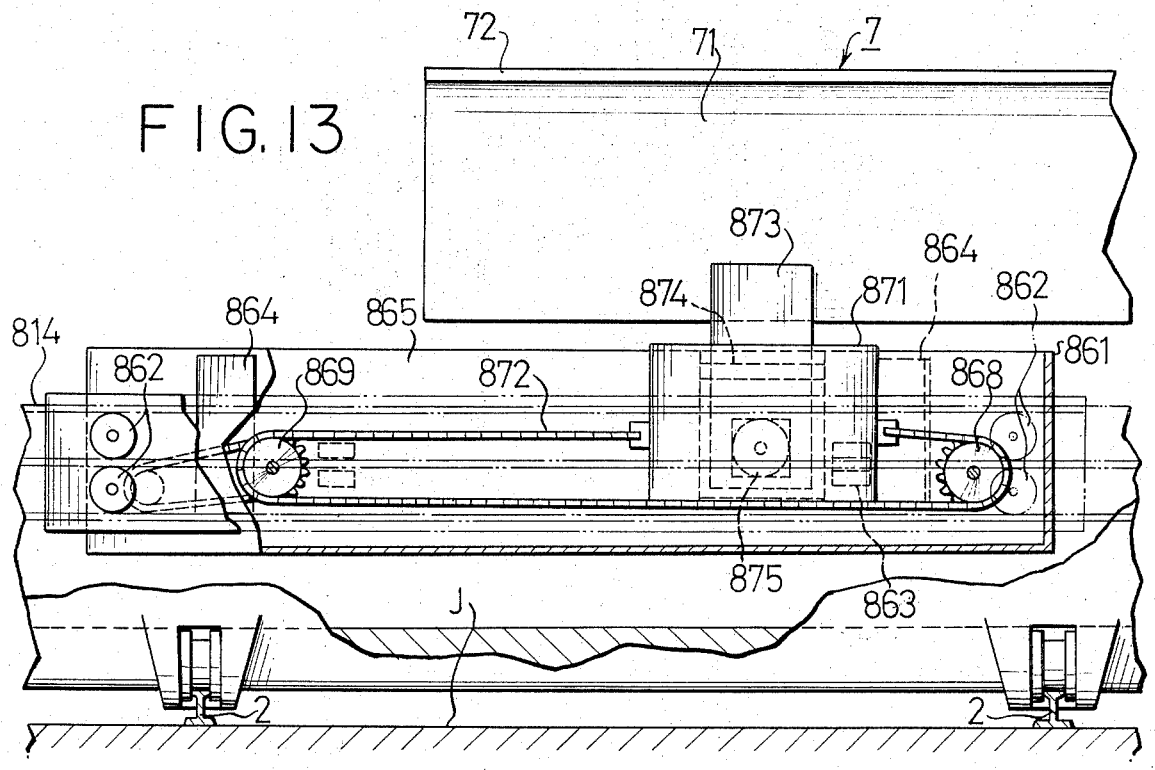
FIG. 13 is a front view thereof.

In the preferred embodiment of the invention specifically shown, two longitudinal feed-out units 86 are provided on the carriage 81, and the specific and detailed structure of the unit 86 is shown in FIGS. 12 and 13.

The unit 86 comprises a base 861 having a rotatable rollers 862 mounted thereon and arranged to cooperate with guide rails 814. Therefore, the unit 86 can be shifted on and along these guide rails, and positioned fixedly at any selected position therealong, by the help of fixing clamp means 863. The base 861 can be thus positioned at its longe feed-out position neighboring to the unit 82, or at any selected intermediate position. If necessary, however, the base 861 can be rigid with the carriage 81 when it is positioned at the longe feed-out end position. Base 861 is provided with a longe feed-out frame 865 which can be moved vertically to-and-fro by selective actuation of four hydraulic piston-cylinder units 864 fitted thereto, said frame 865 being arranged stationary in the longitudinal direction of said base and relative thereto.

Rotatable shafts 866 and 867 are mounted on the frame 865, each of these shafts being provided fixedly with two sprocket wheels 868 and 869, respectively. The shaft 867 is arranged to be driven from an electric motor 870 through drive chain means.

Frame 865 is formed at each side with a guide groove and clamping block member 871 is mounted movably as being guided by these grooves.

Drive chain 872 is threaded between and around each pair of sprocket wheels 868 and 869 and it should be noted that each end of this chain is fixedly attached to the clamping block member 871. With rotation of the electric motor 870 in its regular or reversed direction, the clamping block 871 can be shifted in one or another direction.

A pair of pivotable clamp pawls 873 are mounted through respective pivot pins 874 on the clamping block member 871. A hydraulic piston-and-cylinder unit 875 is provided below said pawls 873 so as to actuate same. By actuation or de-energization of the unit 875 hydraulically, these pawls are actuated for grip the longe 7 therebetween, or released from their working or longe-gripping position.

When in FIG. 13, when the clamping block member 871 is shifted leftwards, clamping pawls 873 are kept in pressure engagement with the longe 7 which is thus shifted in the same direction.

When the clamping block member 871 is returned rightwards back to its original position, the clamping pawls 873 are opened from their longe-gripping position. Therefore, it will be seen from the foregoing that for every reciprocating movement of the clamping block 871, the longe 7 is once shifted leftwards. In this way, the longe 7 is intermittently fed into the gap between each one of two horizontal guide rollers 828 and 831 of the unit 82.

The operation of the machine so far shown and described and adapted for carrying out the process according to this invention is as follows:

At first, a pair of the elongated base members 1 and 1' are moved on and along the guide rails 2 and positioned in parallel to each other and at their certain mutual distance as determined the length of the transverse stock 4. Upon completion of this positional adjustment, these members 1 and 1' are fixed to the rails 2, as was referred to hereinbefore.

Next, pairs of clamps 3 and 3' are moved on and along the now fixed base members 1 and 1' and fixed thereto normally at certain regular intervals when seen in the axial direction of the base member 1 or 1', said intervals corresponding to the predetermined mutual distance between successive transverse stocks 4 to be set for the manufacture of the lattice work block.

On the carriage 81, longitudinal centering unit 82 is adjusted in its longitudinal position properly, thereby the guide roller pair 834 being positioned ready for squeezing the transverse sheet stock 4 therebetween.

Each of the transverse stocks 4 has been prefabricated with a number of T-shaped recesses 41 at regular intervals along the bottom edge thereof. The recess 41 consists of a horizontally extending, enlarged top groove 43 having enough dimensions to allow the head flange 72 of the longitudinal stock 7 to pass freely, yet with only small idle gaps, and of a vertically groove 42 which has a width corresponding to the thickness of the web 71 plus small and ample clearance gap amounting generally to 2 mm. The necessary number of transverse sheet stocks 4 are placed in the form similar to parallel bridge beams on and between the trans-supporting rollers 36 belonging to the respective pairs of the clamps 3 and 3', by operating a crane, now shown. Certain positional adjusting job is necessary to register each row of the T-shaped recesses 41 in line by adjusting the mutual arrangement of these transverse stocks 4. After performing this adjusting job, the transverse stocks 4 are fixedly set by operating the hydraulic clamp cylinders 37, so as to protrude respective hydraulic pistons, not shown thereof for bringing these stocks into pressure contact with the respective rigid abutting members 35.

For performing occasionally necessary deformation-correcting jobs for defective transverse stocks 4, the longitudinal centering unit 82 is adjusting set to a position on the carriage 81 where the guide rollers 834 are ready for gripping the stock 4.

Then, the motors 826 and 830 of the unit 82 are energized electrically for adjusting the heights of frame 824 and horizontal rollers 831 so that the rollers 831 and 828 are positioned ready for contacting with the web 71 of the longe 7 at the upper and lower portion of the web, so as to position and guide the longe in its upright position, as clearly seen from FIG. 10.

Upon completion of the above-mentioned several positioning and adjusting operations, the following steps will be performed in an automatic way.

A drive electric motor, not shown, attached to the carriage 81 is energized electrically to start to such position where the gap between the horizontal rollers 828 and 831 is brought into registration, for instance, with the right-hand end one of the T-shaped recesses 41 when seen in FIG. 7. For this purpose, a position detector of the known construction and operation, not shown, on the carriage is utilized. Upon registered, the carriage 81 is stopped instantly at the position by application of a brake means, not shown, of the known structure.

On the other hand, the carriage 5 is started and stopped similarly at a position where the inner ends of longitudinal stocks 7 mounted in parallel to each other on the carriage 5 are ready for being caught and forwarded by the unit 86.

Then, the longitudinal feeding unit 86 is reciprocated in the aforementioned way, so as to catch the longitudinal stock by the clamping pawl 873 and to advance it. Thus, the longitudinal stock is guided between the rollers 828 and 831 and forcibly forwarded into and through the row of the recesses 41. Since the level of rollers 832 is slightly lower than the rollers 833 of the unit 82, and thus, the longitudinal stock is forwarded at its such position that the lower side edge thereof is slightly protruding from the lower edge of the transverse stock, while it is being forwarded through the related row of the recesses 41 of the transverse stocks 4. The passage of the longitudinal stock 7 through these recesses 41 can be performed without any hindrance thanks to the aforementioned dimensional and configurational design of the recesses 41. Should the transverse stocks be attached with several reinforcing additional members, not shown, any interference and collision could be effectively avoided and the combination job of the transverse stocks with the longitudinal stocks can be performed in a smooth, efficient and automatic way.

In the arrangement shown in FIGS. 5 and 6, the lattice work stock comprises five sheet of transverse stocks 4. Now it is assumed that a longitudinal stock 7 has been passed through the recesses 41 of three successive transverse stocks 4. Then, the longitudinal stock 7 is caught by an intermediate longitudinal stock feeding unit 86 and then further forwarded through the two corresponding recesses 41 of the remaining stocks 4. Upon passing through the final recess 41, the feeding frame 865, and the frame 824 of unit 82 are lowered.

Then, longitudinal stock push-up units 84 and 85 are operated to elevate so as to bring the longitudinal stock 7 to its regular and destined combination position with the transverse stocks 4. While keeping this condition, the carriage 81 is moved to the next working position for forwarding and inserting the next longe 7 into the next row of recesses 41, as was referred to hereinbefore.

At this next working position of the carriage 81, the former longitudinal stock 7 is kept in support by the chain 843 and transferred from the unit 84 to the unit 85. Then, longitudinal push-up unit 84 is lowered. At the stoppage of the carriage 81 at the next or presently selected new working position relative to the second row of recesses 41 under the influence of said position detector, the foregoing longitudinal stock 7 is mounted on the unit 85 and the carriage 81 has been advanced laterally of and from below the foregoing longe. Under these conditions, the foregoing longitudinal stock is provisionally and manually welded to the stocks 4 at the areas of respective T-shaped recesses 41. Since there are only small gaps between the longitudinal stock 7 and the respective recesses 41, can be easily and rapidly performed.

Upon lapse of a certain time period for carrying out said welding job, the longitudinal stock push-up unit 85 is lowered automatically and thus, the combining and welding job of a single longitudinal stock to the transverse stocks has now been completed.

Then, the feeding, insertion and welding operations are separated until all the longitudinal stocks are combined with and welded to the transverse stocks 4, so as to complete a lattice work stock.

The automatic operations are performed with use of a known automatic sequence controller which has been, however, omitted from the drawing by virtue of its very popularity and for avoidance of complexity of the drawing.

Each of the recesses 41 is then filled up relative to all of the longes, by execution of finish welding.

When the lattice work stock should be of water tight construction, the remaining space appearing at each of the enlarged top grooves 43 are filled up by application of a collar and finish-welded thereat.

The embodiments of the invention in which an exclusive property or privilege is claimed are as follows:

1. An apparatus for producing a lattice work comprising a plurality of parallel transverse members and a plurality of parallel longitudinal members; said apparatus comprising:
   a. a first set of guide rail means;
   b. guide base means mounted on said first set of rail means for holding said transverse members;
   c. a second set of guide rail means parallel to said first set of rail means;
   d. carriage means mounted on said second set of guide rail means, said carriage means carrying said longitudinal members such that said longitudinal members are perpendicular to said transverse members; and
   e. feeding means shiftable along said first set of said means for feeding and guiding each of said longitudinal members from said carriage means into engagement with at least one of said transverse members.

2. The apparatus of claim 1 wherein said guide base means comprises two base members said base members being positioned on opposite sides of said transverse members.

3. The apparatus of claim 2 wherein each base member includes a plurality of clamping means each clamping means holding one side of one of said transverse members.

4. The apparatus of claim 3 wherein each of said clamping means is movable in a direction perpendicular to the axis of its corresponding said base member.

5. The apparatus of claim 1 wherein said feeding means includes first roller means for holding said longitudinal member in an upright position and second roller means for supporting said longitudinal member at a predetermined level such that each said longitudinal members is properly aligned for engagement with said transverse members.

6. The apparatus of claim 5 wherein said feeding means includes drive means for moving said longitudinal members in a direction perpendicular to said transverse members and into engagement therewith.

7. The apparatus of claim 6 wherein said drive means includes a chain drive.

8. A process for the manufacturing of a metal lattice work comprising a plurality of parallel longitudinal members and a plurality of parallel transverse members each transverse member having recesses therein said process comprising:
   a. aligning said transverse member such that each recess on said transverse members is aligned with corresponding recesses on all of the other transverse members;
   b. successively feeding said longitudinal members perpendicular to said transverse members such that each longitudinal member engages corresponding recesses in said transverse members; and
   c. welding each longitudinal member to all of said transverse members whereby said lattice work is formed.

* * * * *